E. Horton.
Lathe Chuck.
Nº 13,787. Patented Nov. 13, 1855.
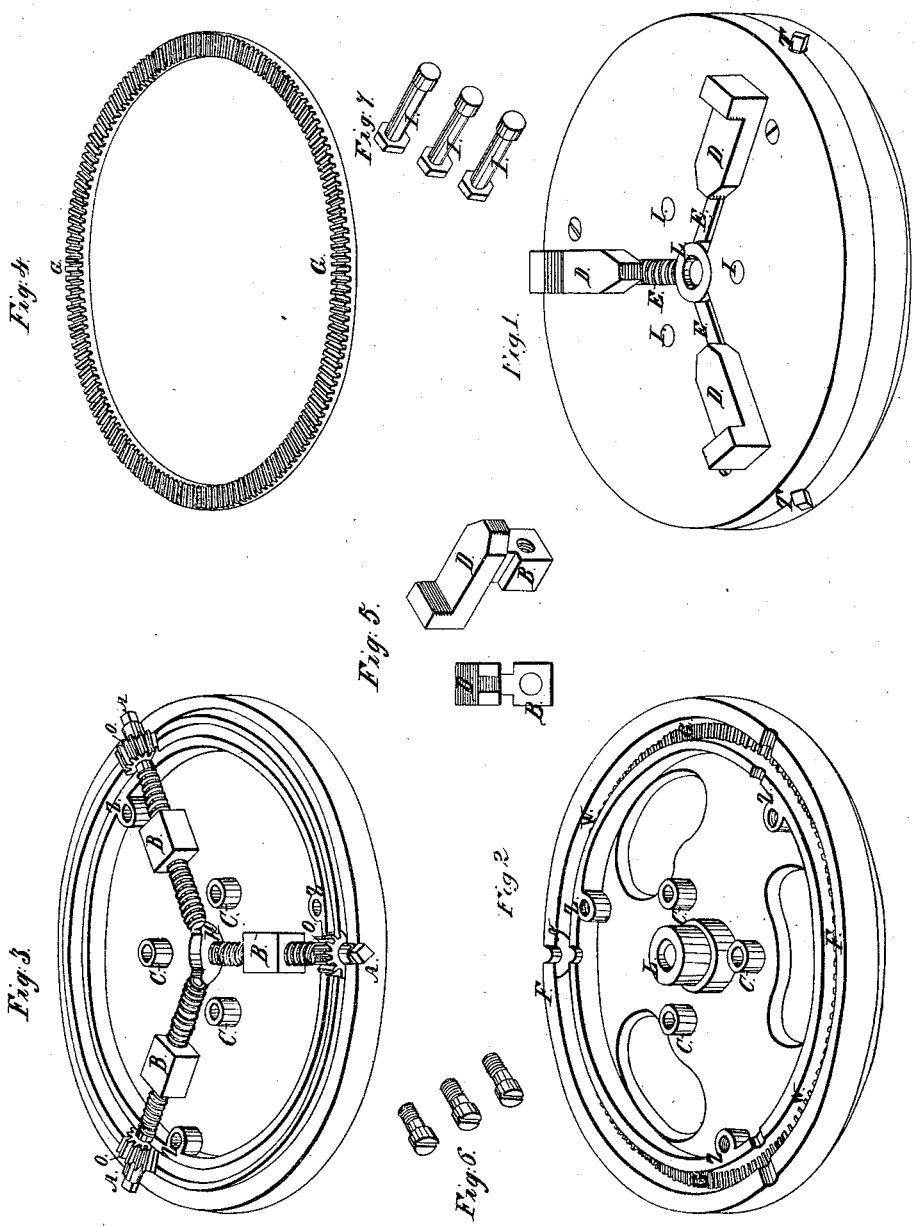

UNITED STATES PATENT OFFICE.

ELI HORTON, OF WINDSOR LOCKS, CONNECTICUT.

LATHE-CHUCK.

Specification of Letters Patent No. 13,787, dated November 13, 1855.

*To all whom it may concern:*

Be it known that I, ELI HORTON, of Windsor Locks, in the county of Hartford and State of Connecticut, have invented certain new and useful Improvements in Lathe-Chucks; and I do hereby declare the following to be a full, clear, and exact description of the same, reference being had to the accompanying drawings, in which—

Figure 1 represents a view of the face of the chuck, Fig. 2 represents the inside of the back plate of the chuck, the face plate being removed. Fig. 3, represents the interior of the chuck on the face plate the back plate being removed to show the parts within. Fig. 4, represents the circular rack which operates or runs the jaws forward and back detached. Fig. 5, represents one of the jaws detached, as seen in two different positions. Figs. 6 and 7, represent screws by which the front and back plates may be united to each other.

To enable others skilled in the art to make and use my invention, I will proceed to describe the same with reference to the drawings.

My chuck is composed of a face and back plate, properly united, within and upon which the several parts are made to operate, as follows:

A, A, A, are screw bolts or rods, running from the periphery toward the center of the chuck, and have their bearings in seats which are cut one half in the upper or face plate, and the other half in the rear plate as seen in Figs. 1, 2, 3. The outer perimeters of both the face and back plates have a flange F, upon them, and within this outer flange, an additional flange Z, so as to leave a deep groove between said flanges, for a purpose to be presently described. The screw bolts or rods A, A, A, having bearings upon each of the flanges F, Z, are thus prevented from getting out of place, and are always held in their radial position to the center of the chuck. On each of the screw rods or bolts A, are permanently arranged, a beveled spur gear O which turns between the flanges F, Z, as the rod or bolt is turned by a wrench applied to their extreme outer ends T. At the bottom of the groove W, formed by the two projecting flanges F, Z, is laid the circular rack G (Figs. 2, 4) so as to freely turn in said groove, and the beveled spur gears or pinions O, all take into or mesh with said circular rack G, so that the turning of any single one of the screw rods A, will, through its pinion and the circular rack, communicate a similar motion to the other screw rods of the series, and thus cause them all to run their jaws forward or back as the case may be. The flanges F, Z, not only serve as guides for the movement of the circular rack, but as a shield to protect the cogs from the chips, filings or dust, which gets into the chuck, and would otherwise cut out the gear, or damage it. Each of the screw bolts or rods A, carry upon them, a solid jaw D, Figs. 1, 5, which have a screw nut B, upon them, through which the screw bolts A, pass. The nut parts B, of the solid jaws are within or between the face and back plates of the chuck, and the jaws traverse toward or from the center, (by the turning of either of the screw rods A), through the slots E, Fig. 1. The jaws are made solid, for the sake of strength, for it is found in practice that, a jaw made of two or more pieces will yield under the strain they must be subjected to, and render them useless for perfect work; and the reason why solid jaws are not universally used, arises from the difficulty of putting them into the chuck, without weakening it. They cannot be put through from the outer edge without so weakening it that it would not withstand the outer pressure or force of the screws. I use a solid jaw, and avoid the difficulty incident to their introduction into the chuck as follows: In the center of the face plate, I cut out a circular hole H, (Fig. 3) through which the nut part B, of the jaws D, will pass, and the jaws are then slipped back through their respective slots E. On the back plate, is a projecting hub L, Figs. 1, 2, which hub, when the back and front plates are put together passes through the opening H, so as to be flush with the face of the front plate, as seen in Fig. 1, and thus closes up the opening H, so that the jaws or the nut part (B) thereof, cannot pass through or out of said opening, until the plates of the chuck are first separated. By this means the force of the screws is extended against solid metal in both directions, and there is no yielding of the chuck.

C, C, C, are sleeves or bosses (Figs. 2, 3,) formed on the back plate, and stand up sufficiently high to have the front plate rest upon them, when it is put in its place. The screw bolts I, I, I, Figs. 1, 7, pass through the two plates, and through the sleeves or bosses C, and thus firmly hold the chuck together without allowing the plates to spring or yield under the action of the screws. Additional screws may be used if found essential, and the same screws which hold the plates together may serve to hold the chuck to the lathe.

Among the advantages which I have gained by my mode of constructing the chuck, I may mention first, that by operating all the jaws, from one of the screw bolts, I can make the threads of the screw bolts much coarser, and consequently stronger. By being coarser, they will also run the jaws out and in faster. A special consideration also, consists in being able after the jaws are run up to whatever they are to hold, by the turning of one screw bolt, the wrench may then be applied to each screw bolt singly, and the backlash all taken up, thus by a single turning to run up the jaws rapidly, and afterward by applying the wrench to each of the bolts, to separately tighten them up, which must of course cause the jaws to firmly and immovably hold anything pressed between them, as there can be no backlash from any of the machinery, it being all taken up by the after application of the wrench. When the wrench is applied to a single screw bolt, the power to turn the other bolts is applied indirectly viz: through the pinions and circular rack; but by using the wrench in rotation upon the bolts singly, the power is directly upon said screw bolt, and the jaw upon it, and consequently much greater than when the whole are moved from one, or by the power indirectly applied. Thus the jaws are worked rapidly, and the clamping effectually accomplished.

Having thus fully described the nature of my invention, what I claim therein as new and desire to secure by Letters Patent is—

1. In combination with the opening H on the front plate for the introduction of the solid jaws the hub L, on the back plate, for closing said opening, and retaining the jaws in their respective slots, substantially as described.

2. I also claim the locating of the circular rack in the deep recess or groove formed between the flanges F, Z, which not only form a tight casing to protect it from chips, filings, &c., but also support it, as well as the shanks of the screw bolts, substantially as set forth.

ELI HORTON.

Witnesses:
C. U. SPENCER,
F. M. BROWN.